United States Patent
Chen et al.

(10) Patent No.: US 7,668,699 B2
(45) Date of Patent: Feb. 23, 2010

(54) OPTIMIZED STOCHASTIC RESONANCE METHOD FOR SIGNAL DETECTION AND IMAGE PROCESSING

(75) Inventors: Hao Chen, Syracuse, NY (US); James Michels, Ithaca, NY (US); Pramod K Varshney, Fayetteville, NY (US)

(73) Assignee: Syracuse University, Syracuse, NY (US)

( * ) Notice: Subject to any disclaimer, the term of this patent is extended or adjusted under 35 U.S.C. 154(b) by 101 days.

(21) Appl. No.: 11/551,473

(22) Filed: Oct. 20, 2006

(65) Prior Publication Data

US 2007/0171964 A1      Jul. 26, 2007

Related U.S. Application Data

(60) Provisional application No. 60/728,504, filed on Oct. 20, 2005.

(51) Int. Cl.
*G06F 15/00*       (2006.01)
*G06F 11/30*       (2006.01)

(52) U.S. Cl. .............. 702/191; 702/181; 702/182; 702/183; 704/226

(58) Field of Classification Search ......... 702/179–189, 702/191, 19–22; 704/226; 375/227
See application file for complete search history.

(56) References Cited

U.S. PATENT DOCUMENTS

2006/0020452 A1*   1/2006   Nakatani et al. ............ 704/226
2006/0074558 A1*   4/2006   Williamson et al. ......... 701/213

\* cited by examiner

*Primary Examiner*—Eliseo Ramos Feliciano
*Assistant Examiner*—Phuong Huynh
(74) *Attorney, Agent, or Firm*—George R. McGuire; David L. Nocilly

(57) ABSTRACT

Apparatus and method for improving the detection of signals obscured by noise using stochastic resonance noise. The method determines the stochastic resonance noise probability density function in non-linear processing applications that is added to the observed data for optimal detection with no increase in probability of false alarm. The present invention has radar, sonar, signal processing (audio, image and video), communications, geophysical, environmental, and biomedical applications.

8 Claims, 10 Drawing Sheets

OPTIMIZED STOCHASTIC RESONANCE METHOD FOR SIGNAL DETECTION AND IMAGE PROCESSING

CROSS-REFERENCE TO RELATED APPLICATIONS

This application claims priority to U.S. Provisional Patent Application No. 60/728,504, filed Oct. 20, 2006.

The U.S. Government has a paid-up license in this invention and the right in limited circumstances to require the patent owner to license others on reasonable terms as provided for by the terms of Contract No. FA9550-05-C-0139 awarded by the Air Force Office of Scientific Research (AFOSR).

BACKGROUND OF THE INVENTION

1. Field of the Invention

The present invention relates to signal detection and, more particularly, to a method of detecting signals and processing images using stochastic resonance.

2. Description of the Related Art

Stochastic resonance (SR) is a nonlinear physical phenomenon in which the output signals of some nonlinear systems can be enhanced by adding suitable noise under certain conditions. The classic SR signature is the signal-to-noise ratio (SNR) gain of certain nonlinear systems, i.e., the output SNR is higher than the input SNR when an appropriate amount of noise is added.

Although SNR is a very important measure of system performance, SNR gain-based SR approaches have several limitations. First, the definition of SNR is not uniform and it varies from one application to another. Second, to optimize the performance, the complete a priori knowledge of the signal is required. Finally, for detection problems where the noise is non-Gaussian, SNR is not always directly related to detection performance; i.e., optimizing output SNR does not guarantee optimizing probability of detection.

In signal detection theory, SR also plays a very important role in improving the signal detectability. For example, improvement of detection performance of a weak sinusoid signal has been reported. To detect a DC signal in a Gaussian mixture noise background, performance of the sign detector can be enhanced by adding some white Gaussian noise under certain circumstances. For the suboptimal detector known as the locally optimal detector (LOD), detection performance is optimum when the noise parameters and detector parameters are matched. The stochastic resonance phenomenon in quantizers results in a better detection performance can be achieved by a proper choice of the quantizer thresholds. Detection performance can be further improved by using an optimal detector on the output signal. Despite the progress achieved by the above approaches, the use the SR effect in signal detection systems is rather limited and does not fully consider the underlying theory of SR.

Simple and robust suboptimal detectors are used in numerous applications. To improve a suboptimal detector detection performance, two approaches are widely used. In the first approach, the detector parameters are varied. Alternatively, when the detector itself cannot be altered or the optimum parameter values are difficult to obtain, adjusting the observed data becomes a viable approach. Adding a dependent noise is not always possible because pertinent prior information is usually not available.

For some suboptimal detectors, detection performance can be improved by adding an independent noise to the data under certain conditions. For a given type of SR noise, the optimal amount of noise can be determined that maximizes the detection performance for a given suboptimal detector. However, despite the progress made, the underlying mechanism of the SR phenomenon as it relates to detection problems has not fully been explored. For example, until now the "best" noise to be added in order to achieve the best achievable detection performance for the suboptimal detector was not known. Additionally, the optimal level of noise that should be used for enhanced performance was also unknown.

BRIEF SUMMARY OF THE INVENTION

It is therefore a principal object and advantage of the present invention to provide a method for determining the best noise to add to improve detection of a suboptimal, non-linear detector.

It is an additional object and advantage of the present invention to provide a method for determining the optimal level of noise for improved detection.

In accordance with the foregoing objects and advantages, the present invention provides a method for signal detection in observed sensor data for a broad range of electromagnetic or acoustic applications such as radar, sonar, as well as imagery such as visual, hyperspectral, and multi-spectral. The method of the present invention is applicable in applications involving non-linear processing of the data. Specifically, the method of the present invention determines the stochastic resonance noise probability density function to be added to either the observed data process to optimize detection with no increase in the false alarm rate, or to an image to optimize the detection of signal objects from the background. In addition, the method of the present invention determines the conditions required for performance improvement using additive stochastic resonance noise. The method of the present invention also yields a constant false alarm rate (CFAR) receiver implementation, which is essential in operational conditions in which it is imperative to maintain false alarm rates without adjusting the detector threshold level.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
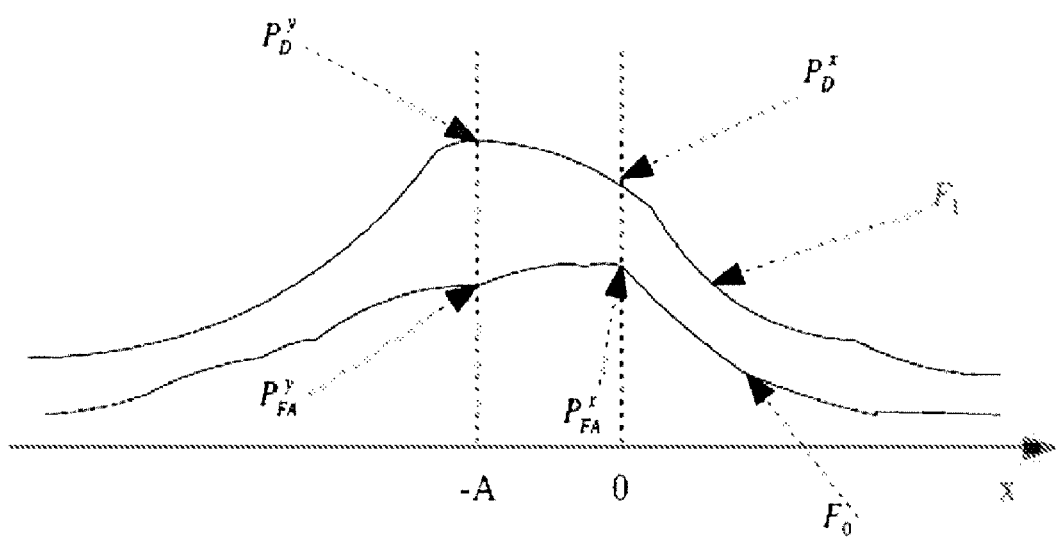
FIG. 1 is a graph of the effect of additive noise according to the present invention.

Referring now to the drawings, wherein like reference numerals refer to like parts throughout, there is seen in FIG. 1 a chart illustrating the effective of additive noise on a given signal.

The following definitions serve to clarify the present invention:

The term "constant false alarm rate" (CFAR) refers to the attribute of a receiver that maintains the false alarm rate fixed in the presence of changing interference levels.

The term "false alarm" refers to the decision that a signal is present when in fact it is not.

The term "false alarm rate" refers to the rate at which a false alarm occurs.

The term "fixed detector" refers to a detector comprised of a fixed test statistic and a fixed threshold.

The term "receiver operating characteristic" (ROC) refers to a plot of the probability of detection as a function of the probability of false alarm for a given detector.

To enhance the detection performance, noise is added to an original data process x to obtain a new data process y given by y=x+n, where n is either an independent random process with pdf $p_n(\cdot)$ or a nonrandom signal. There is no constraint on n. For example, n can be white noise, colored noise, or even be a deterministic signal A, corresponding to $p_n(n)=\delta(n-A)$. As described herein, depending on the detection problem, an improvement of detection performance may not always be possible. In that case, the optimal noise is equal to zero. The pdf of y is expressed by the convolutions of the pdfs such that $$p_y(y) = p_x(x) * p_n(x) = \int_{R^N} p_x(x) p_n(y-x) dx) \quad (7)$$

The binary hypotheses testing problem for this new observed data y can be expressed as:

$$\begin{cases} H_0: p_y(y; H_0) = \int_{R^N} p_0(x) p_n(y-x) dx \\ H_1: p_y(y; H_1) = \int_{R^N} p_1(x) p_n(y-x) dx \end{cases} \quad (8)$$

Since the detector is fixed, i.e., the critical function $\phi$ of y is the same as that for x, the probability of detection based on data y is given by, $$P_D^y = \int_{R^N} \phi(y) p_y(y; H_1) dy \quad (9)$$
$$= \int_{R^N} \phi(y) \int_{R^N} p_1(x) p_n(y-x) dx dy$$
$$= \int_{R^N} p_1(x) \left( \int_{R^N} \phi(y) p_n(y-x) dy \right) dx$$
$$= \int_{R^N} p_1(x) C_{n,\phi}(x) dx = E_1[C_{n,\phi}(x)]$$

Where

-continued
$$C_{n,\phi}(x) \equiv \int_{R^N} \phi(y) p_n(y-x) dy \quad (10)$$

Alternatively, $$P_D^y = \int_{R^N} p_n(x) \left( \int_{R^N} \phi(y) p_1(y-x) dy \right) dx \quad (11)$$
$$= \int F_{1,\phi}(x) p_n(x) dx = E_n(F_{1,\phi}(x))$$

Similarly, $$P_{FA}^y = \int_{R^N} p_0(x) C_{n,\phi}(x) dx = E_0[C_{n,\phi}(x)] \quad (12)$$
$$= \int F_{0,\phi}(x) p_n(x) dx = E_n(F_{0,\phi}(x)) \quad (13)$$

where $$F_{i,\phi}(x) \equiv \int_{R^N} \phi(y) p_i(y-x) dy \quad i=0,1, \quad (14)$$

corresponding to hypothesis $H_i$. $E_i(\cdot)$, $E_n(\cdot)$ are the expected values based on distributions $p_i$ and $p_n$, respectively, and $P^x_{FA} = F_{0,\phi}(0)$, $P^x_D = F_{1,\phi}(0)$. To simplify notation, subscript $\phi$ of F and C may be omitted and denotes as $F_1$, $F_0$, and $C_n$, respectively. Further, $F_1(x_0)$ and $F_0(x_0)$ are actually the probability of detection and probability of false alarm, respectively, for this detection scheme with input $y=x+x_0$. For example, $F_1(-2)$ is the $P_D$ of this detection scheme with input x−2. Therefore, it is very convenient to obtain the $F_1$ and $F_0$ values by analytical computation if $p_0$, $p_1$ and $\phi$ are known. When they are not available, $F_1$ and $F_0$ can be obtained from the data itself by processing it through the detector and recording the detection performance. The optimal SR noise definition may be formalized as follows.

Consider the two hypotheses detection problem. The pdf of optimum SR noise is given by $$p_n^{opt} = \underset{p_n}{\text{argmax}} \int_{R^N} F_1(x) p_n(x) dx \quad (15)$$

where $$p_n(x) \geq 0, \, x \in R^N. \quad 1)$$

$$\int_{R^N} p_n(x) dx = 1. \quad 2)$$

$$\int_{R^N} F_0(x) p_n(x) dx \leq F_0(0). \quad 3)$$

Conditions 1) and 2) are fundamental properties of a pdf function. Condition 3) ensures that $P^y_{FA} \leq P^x_{FA}$, i.e., the $P_{FA}$ constraint specified under the Neyman-Pearson Criterion is satisfied. Further, if the inequality of condition 3) becomes equality, the Constant False Alarm Rate (CFAR) property of the original detector is maintained. A simple illustration of the effect of additive noise is shown in FIG. 1. In the example, $$F_1(-A) = \max_x F_1(x) \text{ and } F_0(-A) < F_0(0),$$

hence $$p_n^{opt} = \delta(x+A)$$

which means the optimal SR noise n=−A is a dc signal with value −A. In practical applications, some additional restrictions on the noise may also be applied. For example, the type of noise may be restricted, (e.g., n may be specified as Gaussian noise), or we may require a noise with even symmetric pdf $p_n(x)=p_n(-x)$ to ensure that the mean value of y is equal to the mean value of x. However, regardless of the additional restrictions, the conditions 1), 2), and 3) are always valid and the optimum noise pdf can be determined for these conditions.

In general, for optimum SR noise detection in Neyman-Peason detection, it is difficult to find the exact form of $p_n(\bullet)$ directly because of condition 3). However, an alternative approach considers the relationship between $p_n(x)$ and $F_i(x)$. From equation (14), for a given value $f_0$ of $F_0$, we have $x = F_0^{-1}(f_0)$, where $F_0^{-1}$ is the inverse function of $F_0$. When $F_0$ is a one-to-one mapping function, x is a unique vector. Otherwise, $F_0^{-1}(f_0)$ is a set of x for which $F_0(x)=f_0$. Therefore, we can express a value or a set of values $f_1$ of $F_1$ as $$f_1 = F_1(x) = F_1(F_0^{-1}(f_0)) \tag{16}$$

Given the noise distribution of $p_n(\bullet)$ in the original RN domain, $p_{n,f_0}(\bullet)$, the noise distribution in the $f_0$ domain can also be uniquely determined. Further, the conditions on the optimum noise can be rewritten in terms of $f_0$ equivalently as 4) $p_{n,f_0}(f_0) \geq 0$ 5) $\int p_{n,f_0}(f_0) df_0 = 1$ 6) $\int f_0 p_{n,f_0}(f_0) df_0 \leq P_{FA}^x$ and $$P_D^y = \int_0^1 f_1 p_{n,f_0}(f_0) df_0, \tag{17}$$

where $p_{n,f_0}(\bullet)$ is the SR noise pdf in the $f_0$ domain.

Compared to the original conditions 1), 2) and 3), this equivalent form has some advantages. First, the problem complexity is dramatically reduced. Instead of searching for an optimal solution in $R^N$, the present invention seeks an optimal solution in a single dimensional space. Second, by applying these new conditions, the present invention avoids the direct use of the underlying pdfs $p_1(\bullet)$ and $p_0(\bullet)$ and replace them with $f_1$ and $f_0$. Note that, in some cases, it is not very easy to find the exact form of $f_0$ and $f_1$. However, recall that $F_1(x_0)$ and $F_0(x_0)$ are the Probability of Detection and Probability of False Alarm, respectively, of the original system with input $x+x_0$. In practical applications, the relationship may be determined by Monte Carlo simulation using importance sampling. In general, compared to $p_1$ and $p_0$, $f_1$ and $f_0$ are much easier to estimate and once the optimum $p_{n,f_0}$ is found, the optimum $p_n(x)$ is determined as well by the inverse of the functions $F_0$ and $F_1$.

Consider the function J(t), such that $J(t)=\sup(f_1:f_0=t)$ is the maximum value of $f_1$ given $f_0$. Clearly, $J(P_{FA}^x) \geq F_1(0) = P_D^x$. It follows that for any noise $p_n$, $$P_D^y(p_n) = \int_0^1 J(f_0) p_{n,f_0}(f_0) df_0 \tag{18}$$

Therefore, the optimum $P_D^y$ is attained when $f_1(f_0)=J(f_0)$ and $P_{D,opt}^y = E_n(J)$.

Improvability of a given detector when SR noise is added can be determined by computing and comparing $P_{D,opt}^y$ and $P_D^x$. When $P_{D,opt}^y > P_D^x$, the given detector is improvable by adding SR noise. However, it requires the complete knowledge of $F_1(\bullet)$ and $F_0(\bullet)$ and significant computation. For a large class of detectors, however, depending on the specific properties of J, it is possible to determine the sufficient conditions for improvability and non-improvability more easily. The conditions are determined using the following theorems.

Theorem 1 (Improvability of Detection via SR): If $J(P_{FA}^x) > P_D^x$ or $J''(P_{FA}^x) > 0$ when J(t) is second order continuously differentiable around $P_{FA}^x$, then there exists at least one noise process n with pdf $p_n(\bullet)$ that can improve the detection performance.

Proof: First, when $J(P_{FA}^x) > P_D^x$, from the definition of J function, we know that there exists at one least one $n_0$ such that $F_0(n_0) = P_{FA}^x$ and $F_1(n_0) = J(P_{FA}^x) > P_D^x$. Therefore, the detection performance can be improved by choosing a SR noise pdf $P_n(n) = \delta(n-n_0)$. When $J''(P_{FA}^x) > 0$ and is continuous around $P_{FA}^x$, there exists an $\epsilon > 0$ such that $J''(\bullet) > 0$ on $I = (P_{FA}^x - \epsilon, P_{FA}^x + \epsilon)$. Therefore, from Theorem A-1, J is convex on I. Next, add noise n with pdf $p_n(x) = \frac{1}{2}\delta(x-x_0) + \frac{1}{2}\delta(x+x_0)$, where $F_0(x_0) = P_{FA}^x + \epsilon/2$ and $F_0(x_1) = P_{FA}^x - \epsilon/2$. Due to the convexity of J, $$P_D^y = \frac{J(P_{FA}^x - \frac{\epsilon}{2}) + J(P_{FA}^x - \frac{\epsilon}{2})}{2} > J(P_{FA}^x) \geq P_D^x$$

Thus, detection performance can be improved via the addition of SR noise.

Theorem 2 (Non-improvability of Detection via SR): If there exists a non-decreasing concave function $\Psi(f_0)$ where $\Psi(P_{FA}^x) = J(P_{FA}^x) = F_1(0)$ and $\Psi(f_0) \geq J(f_0)$ for every $f_0$, then $P_D^y \leq P_D^x$ for any independent noise, i.e., the detection performance cannot be improved by adding noise.

Proof: For any noise n and corresponding y, we have $$P_D^y(p_n) = \int_0^1 J(f_0) p_{n,f_0}(f_0) df_0 \tag{19}$$

$$\leq \int_0^1 \Psi(f_0) p_{n,f_0}(f_0) df_0$$

$$\leq \Psi\left(\int_0^1 f_0 p_{n,f_0}(f_0) df_0\right)$$

$$\leq \Psi(P_{FA}^x) = P_D^x$$

The third inequality of the Right Hand Side (RHS) of (19) is obtained using the concavity of the $\Psi$ function. The detection performance cannot be improved via the addition of SR noise.

Before determining the form of the optimum SR noise PDF, i.e., the exact pdf of $p_n^{opt}$, the following result for the form of optimum SR noise must be determined.

Theorem 3 (Form of Optimum SR Noise): To maximize $P_D^y$, under the constraint that $P_{FA}^y \leq P_{FA}^x$, the optimum noise can be expressed as:

$$p_n^{opt}(n) = \lambda\delta(n-n_1) + (1-\lambda)\delta(n-n_2) \quad (20)$$

where $0 \leq \lambda \leq 1$. In other words, to obtain the maximum achievable detection performance given the false alarm constraints, the optimum noise is a randomization of two discrete vectors added with the probability $\lambda$ and $1-\lambda$, respectively.

Proof: Let $U = \{(f_1, f_0) | f_1 = F_1(x), f_0 = F_0(x), x \in R^N\}$ be the set of all pairs of $(f_1; f_0)$. Since $0 \leq f_1; f_0 \leq 1$, U is a subset of the linear space $R^2$. Furthermore, let V be the convex hull of U. Since $V \subset R^2$, its dimension $Dim(V) \leq 2$. Similarly, let the set of all possible $(P_D^y; P_{FA}^y)$ be W. Since any convex combination of the elements of U, say $$(\chi, \phi) = \sum_{i=1}^{M} \alpha_i (f_{1,i}, f_{0,i})$$

can be obtained by setting the SR noise pdf such that $$p_{n,f_0}(f_0) = \sum_{i=1}^{M} \alpha_i \delta(f_0 - f_{0,i})$$

$V \subseteq W$. It can also be shown that $W \subseteq V$. Otherwise, there would exist at least one element z such that $z \in W$, but $z \notin V$. In this case, there exists a small set S and a positive number $\tau$ such that $$S = \{(x,y) | \|(x,y)-z\|_2^2 < \tau\} \text{ and } S \cap V = \text{`}\{\}\text{'}$$

where '{ }' denotes an empty set. However, since $0 \leq f_1; f_0 \leq 1$, by the well known property of integration, there always exists a finite set E with finite elements such that $E \subseteq U$ and $(x_1; y_1)$, a convex combination of the elements of E, such that $$\|(x_1, y_1) - z\|_2^2 < \tau$$

Since $(x_1; y_1) \in V$, then $(x_1; y_1) \in (V \cap S)$ which contradicts the definition of S. Therefore, $W \subseteq V$. Hence, $W = V$. From Theorem A-4, $(P_D^y; P_{FA}^y)$ can be expressed as a convex combination of three elements. Also, since we are only interested in maximizing $P_D$ under the constraint that $P_{FA}^y \leq P_{FA}^x$, the optimum pair can only belong to B, the set of the boundary elements of V. To show this, let $(f_1^*; f_0^*)$ be an arbitrary non-boundary point inside V. Since there exists a $\tau > 0$ such that $(f_1^* + \tau, f_0^*) \in V$, then $(f_1^*; f_0^*)$ is inadmissible as an optimum pair. Thus, the optimum pair can only exist on the boundary and each z on the boundary of V can be expressed as the convex combination of only two elements in U. Hence, $$(P_{D,opt}^y, P_{FA,opt}^y) = \lambda(f_{11}, f_{01}) + (1-\lambda)(f_{12}, f_{02}) \quad (21)$$

where $(f_{11}; f_{01}); (f_{12}; f_{02}) \in U$, $0 \leq \lambda \leq 1$. Therefore, we have $$p_{n,f_0}^{opt} = \lambda\delta(f_0 - f_{01}) + (1-\lambda)\delta(f_0 - f_{02}) \quad (22)$$

Equivalently, $p_n^{opt}(n) = \lambda\delta(n-n_1) + (1-\lambda)\delta(n-n_2)$, where $n_1$ and $n_2$ are determined by the equations $$\begin{cases} F_0(n_1) = f_{01} \\ F_1(n_1) = f_{11} \\ F_0(n_2) = f_{02} \\ F_1(n_2) = f_{12} \end{cases} \quad (23)$$

Alternatively, the optimum SR noise can also be expressed in terms of $C_n$, such that $$C_n^{opt}(x) = \lambda\phi(x+n_1) + (1-\lambda)\phi(x+n_2) \quad (24)$$

From equation (22), we have $$P_{D,opt}^y = \lambda J(f_{01}) + (1-\lambda)J(f_{02}) \quad (25)$$

and $$P_{FA,opt}^y = \lambda f_{01} + (1-\lambda)f_{02} \leq P_{FA}^x \quad (26)$$

Depending on the location of the maxima of $J(\cdot)$, determination of the pdf of optimum SR noise may be accomplished according to the following theorem.

Theorem 4:

Let $F_{1M} = \max(J(t))$ and $t_0 = \arg\min_t (J(t) = F_{1M})$.

It follows that

Case 1: If $t_o \leq P_{FA}^x$, then $P_{FA,opt}^x = t_o$ and $P_{D,opt}^y = F_{1M}$, i.e., the maximum achievable detection performance is obtained when the optimum noise is a DC signal with value $n_0$, i.e., $$p_n^{opt}(n) = \delta(n - n_0) \quad (27)$$

where $F_0(n_o) = t_o$ and $F_1(n_o) = F_{1M}$.

Case 2: If $t_o > P_{FA}^x$, then $P_{FA,opt}^x = F_0(0) = P_{FA}^x$, i.e., the inequality of (26) becomes equality. Furthermore, $$P_{FA,opt}^y = \lambda f_{01} + (1-\lambda)f_{02} = P_{FA}^x \quad (28)$$

Proof: For Case 1, notice that $$P_D^y = \int_0^1 J(f_0) p_{n,f_0}(f_0) df_0 \leq \int_0^1 F_{1M} p_{n,f_0}(f_0) df_0 = F_{1M}$$

and $F_1(n_0) = F_{1M}$. Therefore the optimum detection performance is obtained when the noise is a DC signal with value $n_0$ with $P_{FA}^y = t_0$.

The contradiction method is used to prove Case 2. First, supposing that the optimum detection performance is obtained when $P_{FA,opt}^y = \kappa < P_{FA}^x$ with noise pdf $p_{n,f_0}^{opt}(f_0)$.

$$\text{Let } p_{n_1,f_0}(f_0) = \frac{P_{FA}^x - \kappa}{t_0 - \kappa}\delta(f_0 - t_0) + \frac{t_0 - P_{FA}^x}{t_0 - \kappa} p_{n,f_0}^{opt}(f_0).$$

It is easy to verify that $p_{n,f_0}(f_0)$ is a valid pdf. Let $y_1 = x + n1$. We now have $$P_{FA}^{y_1} = \frac{P_{FA}^x - \kappa}{t_0 - \kappa} t_0 + \frac{t_0 - P_{FA}^x}{t_0 - \kappa}\kappa = P_{FA}^x,$$

and $$P_D^{y_1} = \frac{P_{FA}^x - \kappa}{t_0 - \kappa} F_{1M} + \frac{t_0 - P_{FA}^x}{t_0 - \kappa} P_{D,opt}^y > P_{D,opt}^y$$

But this contradicts (15), the definition of $p_n^{opt}$. Therefore, $P_{FA,opt}^y = P_{FA}^x$, i.e., the maximum achievable detection performance is obtained when the probability of false alarm remains the same for the SR noise modified observation y.

Figure 4:
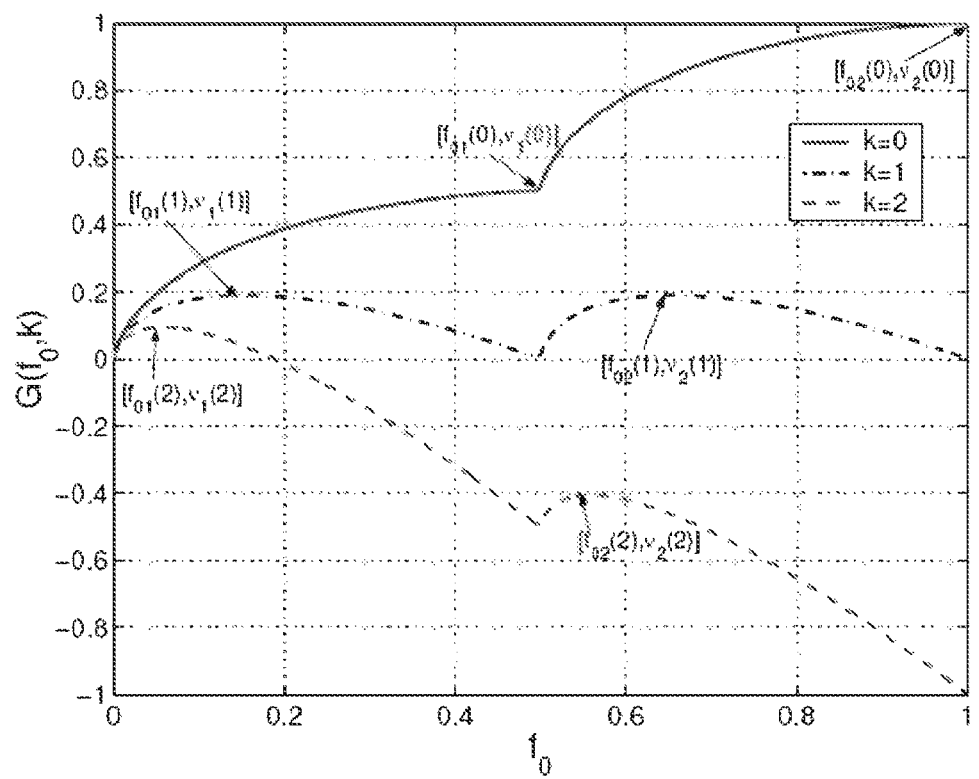
FIG. 4 is a graph of the relationship between $G(f_0; k)$, $f_0$, $f_{0i}(k)$, $v_i(k)$ with i=1, 2 and different k value 0, 1 and 2 according to the present invention.

For Case 2 of Theorem 4, i.e., when $t_0 > P_{FA}^x$, let us consider the following construction to derive the form of the optimum noise pdf. From Theorem 4, we have the condition that $P_{FA,opt}^y = F_0(0) = P_{FA}^x$ is a constant. Define an auxiliary function G such that $$G(f_0, k) = J(f_0) - kf_0, \quad (29)$$

where $k \in R$. We have $P_D^y = E_n(J) = E_n(G(f_0, k)) + kE_n(f_0) = E_n(G(f_0; k)) + k P_{FA}^x$. Hence, $p_{n,f_0}^{opt}$ also maximizes $E_n(G(f_0; k))$ and vice versa. Therefore, under the condition that $P_{FA}^y = P_{FA}^x$, maximization of $P_D^y$ is equivalent to maximization of $E_n(G(f_0; k))$. Divide the domain of $f_0$ into two intervals $I_1 = [0, P_{FA}^x]$ and $I_2 = [P_{FA}^x, 1]$. Let $f_{01}(k)$ be the minimum value that maximizes $G(f_0; k)$ in $I_1$ and let $f_{02}(k)$ be the minimum value that maximizes $G(f_0; k)$ in $I_2$. Also, let $v_1(k) = G(f_{01}; k)$ and $v_2(k) = G(f_{02}; k)$ be the corresponding maximum values. Since for any $f_0$, $G(f_0; k)$ is monotonically decreasing when k is increasing, $v_1(k)$ and $v_2(k)$ are monotonically decreasing while $f_{01}(k)$ and $f_{02}(k)$ are monotonically non-increasing when k is increasing. Since $G(f_0; 0) = J$, therefore $v_2(0) = F_{1M} > v_1(0)$, furthermore, when k is very large, we have $v_1(k) = J(0) > v_2(k) = J(P_{FA}^x) - k P_{FA}^x$. Hence, there exists at least one $k_0 > 0$ such that $v_1(k_0) = v_2(k_0) \equiv v$. For illustration purposes, the plots of $G(f_0; k)$ for the detection problem discussed below are shown in FIG. 4. Divide the [0,1] interval into two non-overlapping parts A, $\{f_{01}(k_0), f_{02}(k_0)\}$, such that $\{f_{01}(k_0); f_{02}(k_0)\} \cup A = [0,1]$ and $\{f_{01}(k_0); f_{02}(k_0)\} \cap A = \{\,\}$. Next, represent $p_{n,f_0}(f_0)$ as $$p_{n,f_0}(f_0) = \alpha_1 \delta(f_0 - f_{01}(k_0)) + \alpha_2 \delta(f_0 - f_{02}(k_0)) + I_A(f_0) p_{n,f_0}(f_0) \quad (30)$$

where $I_A(f_0) = 1$ for $f_0 \in A$ and is zero otherwise (an indicator function). From equation (5), we must have $$\alpha_1 + \alpha_2 + \int_A p_{n,f_0} df_0 = 1, \quad (31)$$

and $$E_n(G) = (\alpha_1 + \alpha_2)v + \int_A G(f_0, k_0) p_{n,f_0} df_0 \quad (32)$$

$$= v + \int_A \underbrace{(G(f_0, k_0) - v)}_{\leq 0} p_{n,f_0} df_0 \leq v$$

Note that $J(f_0) \leq v$ for all $f_0 \in A$. Clearly, the upper bound can be attained when $p_{n,f_0} = 0$ for all $f_0 \in A$, i.e., $\alpha_1 + \alpha_2 = 1$. Therefore, $P_{D,opt}^y$ $P_{D,opt}^y = E_n(G) + k_0 P_{FA}^x = v + k_0 P_{FA}^x$. From equation (28), we have $$p_{n,f_0}^{opt}(f_0) = \quad (33)$$

$$\frac{f_{02}(k_0) - P_{FA}^x}{f_{02}(k_0) - f_{01}(k_0)} \delta(f_0 - f_{01}(k_0)) + \frac{P_{FA}^x - f_{01}(k_0)}{f_{02}(k_0) - f_{01}(k_0)} \delta(f_0 - f_{02}(k_0))$$

Notice that by letting $$\lambda = \frac{f_{02}(k_0) - P_{FA}^x}{f_{02}(k_0) - f_{01}(k_0)},$$

(33) is equivalent to (22).

Equivalently, we have the expression of $p_n^{opt}(n)$ as $$p_n^{opt}(n) = \frac{f_{02}(k_0) - P_{FA}^x}{f_{02}(k_0) - f_{01}(k_0)} \delta(n - n_1) + \frac{P_{FA}^x - f_{01}(k_0)}{f_{02}(k_0) - f_{01}(k_0)} \delta(n - n_2) \quad (34)$$

Further, in the special case where $f_1$ is continuously differentiable, G is also continuously differentiable. Since $f_{01}$ and $f_{02}$ are at least local maxima, we have $$\frac{\partial G}{\partial f_0}(f_{01}, k_0) = \frac{\partial G}{\partial f_0}(f_{02}, k_0) = 0$$

Therefore, from the derivative of (29), we have $$\frac{dJ}{df_0}(f_{01}(k_0)) = \frac{dJ}{df_0}(f_{02}(k_0)) = k_0 \quad (35) \text{ and } (36)$$

$$J(f_{02}(k_0)) - J(f_{01}(k_0)) = k_0(f_{02}(k_0) - (f_{01}(k_0))$$

In other words, the line connecting $(J(f_{01}(k_0)), f_{01}(k_0))$ and $J(f_{02}(k_0)), f_{02}(k_0))$ is the bi-tangent line of $J(\bullet)$ and $k_0$ is its slope. Also, $$P_{D,opt}^y = v + k_0 P_{FA}^x \quad (37)$$

Thus, the condition under which SR noise can improve detection performance has been derived, and the specific form of the optimum SR noise has been obtained.

Detection Example

In a detection problem where two hypotheses H0 and H1 are given as $$\begin{cases} H_0 x[i] = \omega[i] \\ H_1 x[i] = A + \omega[i], \end{cases} \quad (38)$$

for $i = 0, 1, \ldots, N-1$, $A > 0$ is a known dc signal, and w[i] are i.i.d noise samples with a symmetric Gaussian mixture noise pdf as follows $$p_w(w) = \frac{1}{2}\gamma(w; -\mu, \sigma_0^2) + \frac{1}{2}\gamma(w; \mu, \sigma_0^2) \quad (39)$$

and where $$\gamma(w; \mu, \sigma_0^2) = \frac{1}{\sqrt{2\pi\sigma^2}} \exp\left[-\frac{(w-\mu)^2}{2\sigma^2}\right]$$

setting $\mu = 3$, $A = 1$ and $\sigma_0 = 1$. A suboptimal detector is considered with test statistic $$T(x) = \frac{1}{N} \sum_{i=0}^{N-1} \left(\frac{1}{2} + \frac{1}{2}\text{sgn}(x[i])\right) = \frac{1}{N} \sum_{i=0}^{N-1} (\varpi_x[i]) \quad (40)$$

where $$\varpi_x[i] = \frac{1}{2} + \frac{1}{2}\text{sgn}(x[i]).$$

From equation (40), this detector is essentially a fusion of the decision results of N i.i.d. sign detectors.

When N=1, the detection problem reduces to a problem with the test statistic $T_1(x)=x$, thresholds $\eta=0$ (sign detector) and the probability of false alarm $P_{FA}^x=0.5$. The distribution of x under the $H_0$ and $H_1$ hypotheses can be expressed as $$p_0(x) = \frac{1}{2}\gamma(x; -\mu, \sigma_0^2) + \frac{1}{2}\gamma(x; \mu, \sigma_0^2) \quad (41)$$

and $$p_1(x) = \frac{1}{2}\gamma(x; -\mu+A, \sigma_0^2) + \frac{1}{2}\gamma(x; \mu+A, \sigma_0^2) \quad (42)$$

respectively. The critical function is given by $$\phi(x) = \begin{cases} 1 & x > 0 \\ 0 & x \leq 0. \end{cases} \quad (43)$$

The problem of determining the optimal SR noise is to find the optimal p(n) where for the new observation y=x+n, the probability of detection $P_D^y = p(y>0;H_1)$ is maximum while the probability of false alarm $P_{FA}^y = p(y>0;H_0) \leq P_{FA}^x = \frac{1}{2}$.

When N>1, the detector is equivalent to a fusion of N individual detectors and the detection performance monotonically increases with N. Like the N=1 case, when the decision function is fixed, the optimum SR noise can be obtained by a similar procedure. Due to space limitations, only the suboptimal case where the additive noise n is assumed to be an i.i.d noise is considered here. Under this constraint, since the $P_D$s and $P_{FA}$s of each detector are the same, it can be shown that the optimal noise for the case N>1 is the same as N=1 because $P_{FA} \leq 0.5$ is fixed for each individual detector while increasing its $P_D$. Hence, only the one sample case (N=1) is considered below. However, the performance of the N>1 case can be derived similarly.

The determination of the optimal SR noise pdf follows from equations (11) and (13), where it can be shown that in this case, $$F_1(x) = \int_0^{+\infty} \phi(y) p_1(y-x) dy \quad (44)$$

$$= \frac{1}{2}\left(\int_0^{+\infty} [\gamma(y-x; -\mu+A, \sigma_0^2) + \gamma(y-x; \mu+A, \sigma_0^2)] dy\right)$$

$$= \frac{1}{2}Q\left(\frac{-x-\mu-A}{\sigma_0}\right) + \frac{1}{2}Q\left(\frac{-x+\mu-A}{\sigma_0}\right)$$

and $$F_0(x) = \int_0^{\infty} \phi(y) p_0(y-x) dy \quad (45)$$

$$= \frac{1}{2}\left(\int_0^{+\infty} [\gamma(y-x; -\mu, \sigma_0^2) + \gamma(y-x; \mu, \sigma_0^2)] dy\right)$$

$$= \frac{1}{2}Q\left(\frac{-x-\mu}{\sigma_0}\right) + \frac{1}{2}Q\left(\frac{-x+\mu}{\sigma_0}\right)$$

where $$Q(x) = \int_x^{\infty} \frac{1}{\sqrt{2\pi}} \exp(-t^2/2) dt.$$

Figure 2:
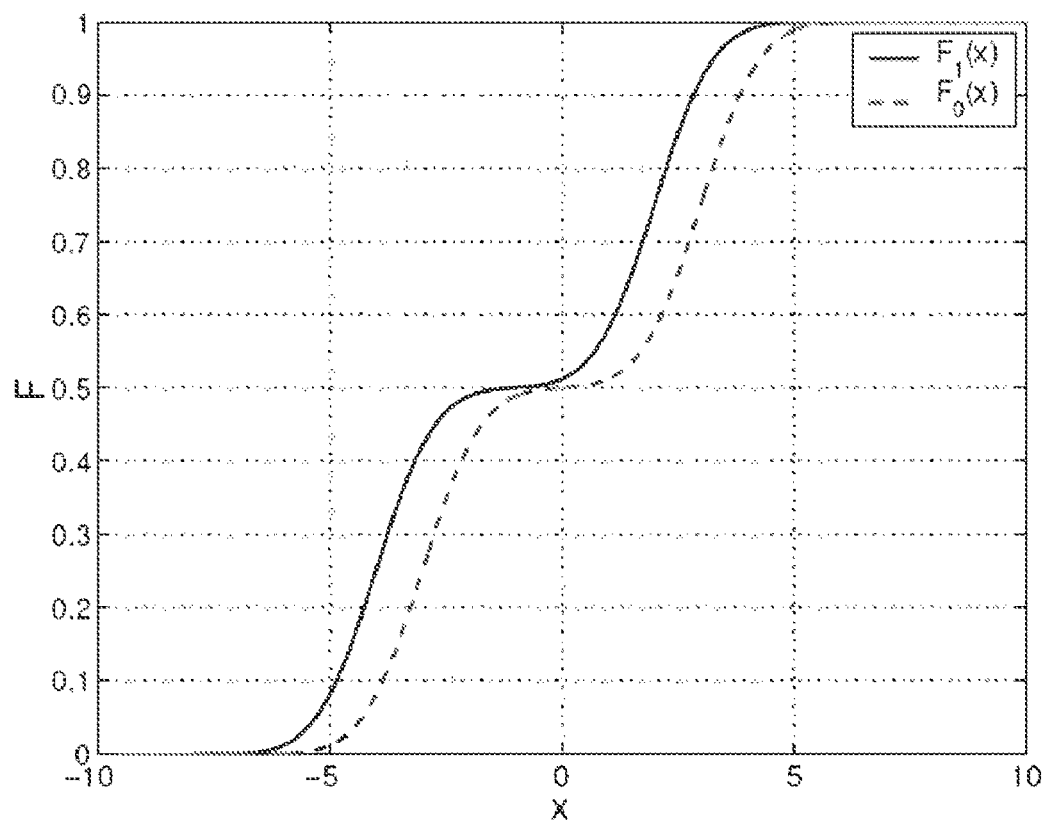
FIG. 2 is a graph of the values of $F_1$ and $F_0$ as a function of x according to the present invention.
Figure 3:
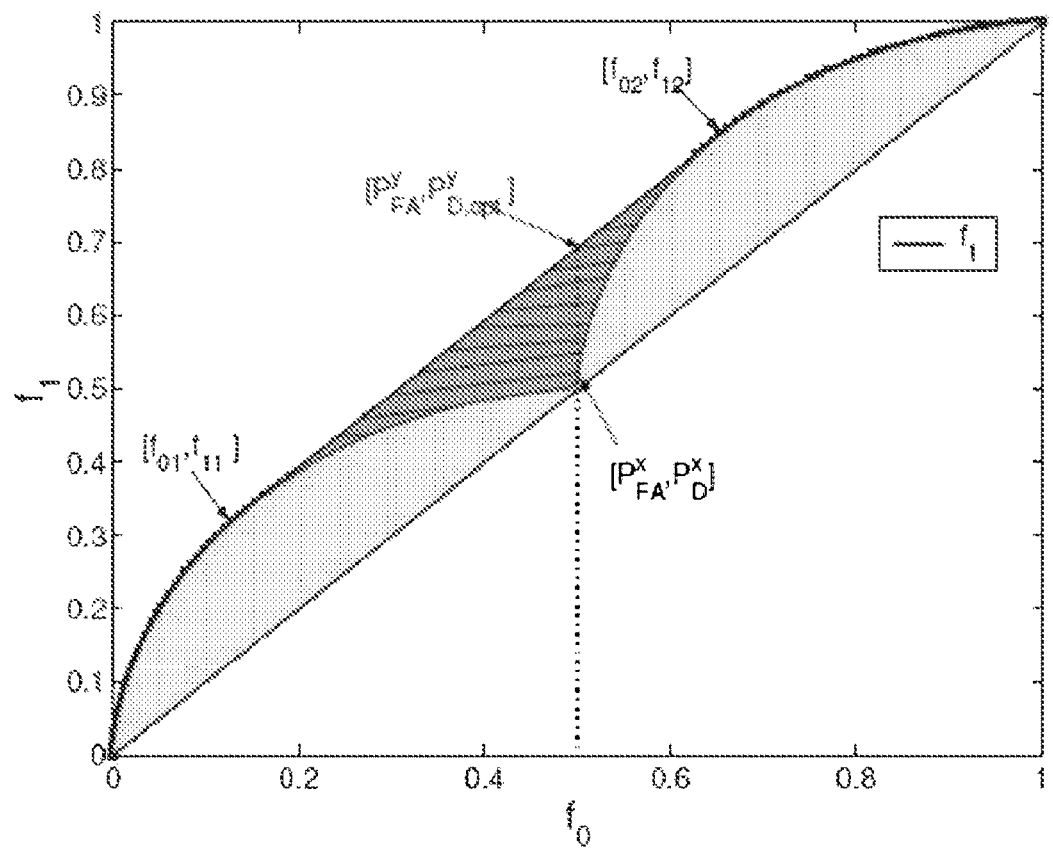
FIG. 3 is a graph of the relationship between $f_1$ and $f_0$ according to the present invention.

It is also easy to show that, in this case, $F_1(x) > F_0(x)$ and both are monotonically increasing with x. Therefore, $J(f_0)=f_1(f_0)=f_1$, and $U=(f_1; f_0)$ is a single curve. FIG. 2 shows the values of $f_1$ and $f_0$ as a function of x, while the relationship between $F_1$ and $F_0$ is shown in FIG. 3. V, the convex hull of all possible $P_D$ and $P_{FA}$ after n is added and shown as the light and dark shadowed regions in FIG. 3. Note that a similar non-concave ROC occurs in distributed detection systems and dependent randomization is employed to improve system performance. Taking the derivative of $f_1$ w.r.t. $f_0$, we have $$\frac{d(f_1)}{d(f_0)} = \frac{\frac{d(f_1)}{d(x)}}{\frac{d(f_0)}{d(x)}} = \frac{p_1(-x)}{p_0(-x)}, \quad (46)$$

and $$\frac{d^2(f_1)}{d(f_0^2)} = \frac{1}{p_0(-x)} \frac{d\left(\frac{p_1(-x)}{p_0(-x)}\right)}{dx} \quad (47)$$

$$= \frac{-p_1'(-x)p_0(-x) + p_0'(-x)p_1(-x)}{p_0^3(-x)}$$

where $x=F_0^{-1}(f_0)$. Since $$\frac{d\gamma(y-x; \mu, \sigma^2)}{dx} = \frac{\mu-x}{\sigma^2} \gamma(y-x; \mu, \sigma^2)$$

we have $p'_0(-x)|_{x=0}$ and $$\left.\frac{d^2(f_1)}{d(f_0^2)}\right|_{f_0=f_0(0)} = \left.\frac{-p_1'(-x)p_0(-x) + p_0'(-x)p_1(-x)}{p_0^3(-x)}\right|_{x=0} \quad (48)$$

$$= \left.\frac{-p_1'(-x)}{p_0^2(-x)}\right|_{x=0}$$

$$= \frac{(\mu-A)\exp\left(-\frac{(\mu-A)^2}{2\sigma_0^2}\right)}{\sqrt{2\pi}\,\sigma_0^3 p_0^2(0)}$$

$$= \frac{(\mu+A)\exp\left(-\frac{(\mu+A)^2}{2\sigma_0^2}\right)}{\sqrt{2\pi}\,\sigma_0^3 p_0^2(0)}.$$

With respect to the improvability of this detector, when $A<\mu$, setting (48) equal to zero and solving the equation for $\sigma_0$, we have $\sigma_1$, the zero pole of (48)

$$\sigma_1 = \sqrt{2\frac{\mu A}{\ln\left(\frac{\mu+A}{\mu-A}\right)}}.$$

When $\sigma_0 < \sigma_1$, then $$\left.\frac{d^2(f_1)}{d(f_0^2)}\right|_{f_0=F_0(0)} > 0$$

and, in this example, $\sigma_1^2 = 8.6562 > \sigma_0^2 = 1$. From Theorem 1, this detector is improvable by adding independent SR noise.

When $$A > \mu, \left.\frac{d^2(f_1)}{d(f_0^2)}\right|_{f_0=f_0(0)} < 0$$

the improvability cannot be determined by Theorem 1. However, for this particular detector, as discussed below, the detection performance can still be improved.

The two discrete values as well as the probability of their occurrence may be determined by solving equations (35) and (36). From equations (44) and (45), the relationship between $f_1$, $f_0$ and x, and equation (46), we have (49)

$$\frac{p_1(-n_1)}{p_0(-n_1)} = \frac{p_1(-n_2)}{p_0(-n_2)} \qquad (49)$$

$$\frac{F_1(n_1) - F_1(n_2)}{F_0(n_1) - F_0(n_2)} = \frac{p_1(-n_2)}{p_0(-n_2)}$$

Although it is generally very difficult to solve the above equation analytically, in this particular detection problem, $$p_1\left(-\left(\mu - \frac{A}{2}\right)\right) = 0.5\gamma\left(-\frac{A}{2}; 0, \sigma_0^2\right) + 0.5\gamma\left(2\mu + \frac{A}{2}; 0, \sigma_0^2\right),$$

$$p_0\left(-\left(\mu - \frac{A}{2}\right)\right) = 0.5\gamma\left(-\frac{A}{2}; 0, \sigma_0^2\right) + 0.5\gamma\left(2\mu - \frac{A}{2}; 0, \sigma_0^2\right),$$

$$p_1\left(-\left(-\mu - \frac{A}{2}\right)\right) = 0.5\gamma\left(-\frac{A}{2}; 0, \sigma_0^2\right) + 0.5\gamma\left(2\mu - \frac{A}{2}; 0, \sigma_0^2\right),$$

$$p_0\left(-\left(-\mu - \frac{A}{2}\right)\right) = 0.5\gamma\left(-\frac{A}{2}; 0, \sigma_0^2\right) + 0.5\gamma\left(2\mu + \frac{A}{2}; 0, \sigma_0^2\right),$$

so that $$\frac{p_1\left(-\left(\mu - \frac{A}{2}\right)\right)}{p_0\left(-\left(\mu - \frac{A}{2}\right)\right)} \cong 1, \quad \frac{p_1\left(-\left(-\mu - \frac{A}{2}\right)\right)}{p_0\left(-\left(-\mu - \frac{A}{2}\right)\right)} \cong 1$$

and $$F_1\left(\left(\mu - \frac{A}{2}\right)\right) - F_1\left(\left(-\mu - \frac{A}{2}\right)\right) = F_0\left(\left(\mu - \frac{A}{2}\right)\right) - F_0\left(\left(-\mu - \frac{A}{2}\right)\right)$$

given $2\mu - A/2 > 3\sigma_0$. Thus, the roots $n_1$; $n_2$ of equation (49) can be approximately expressed as $n_1 = -\mu - A/2$ and $n_2 = \mu - A/2$.
Correspondingly, $$\lambda = \frac{F_0(n_2) - F_0(0)}{F_0(n_2) - F_0(n_1)} \text{ and } 1 - \lambda = \frac{F_0(0) - F_0(n_1)}{F_0(n_2) - F_0(n_1)}.$$

Hence $$p_n^{opt}(n) = \lambda\delta(n - n_1) + (1 - \lambda)\delta(n - n_2) \qquad (50)$$
$$= 0.3085\delta(n + 3.5) + 0.6915\delta(n - 2.5),$$

and $$P_{D,opt}^y = \lambda F_1(n_1) + (1 - \lambda)F_1(n_2) = 0.6915. \qquad (51)$$

The present invention also encompasses special cases where the SR noise is constrained to be symmetric. These include symmetric noise with arbitrary pdf $p_s(x)$, white Gaussian noise $p_g(x) = \gamma(x; 0, \sigma^2)$ and white uniform noise $p_u(x) = 1/a$, $a > 0$, $-a/2 \leq x \leq a/2$. The noise modified data processes are denoted as $y_s$, $y_g$ and $y_u$, respectively. Here, for illustration purposes, the pdfs of these suboptimal SR noises may be found by using the C(x) functions. The same results can be obtained by applying the same approach as in the previous subsection using $F_1(\cdot)$ and $F_0(\cdot)$ functions. For the arbitrary symmetrical noise case, we have the condition $$p_s(x) = p_s(-x). \qquad (52)$$

Therefore, $p(y|H_0)$ is also a symmetric function, so that $P_{FA}^{y_s} = 1/2$. By equations (43) and (52), we have $$C_s(x) = \int_0^\infty p_s(t - x)dt \qquad (53)$$
$$= \int_{-x}^\infty p_s(t)dt$$
$$= \int_{-\infty}^x p_s(t)dt$$
$$= 1 - C_s(-x).$$

Since $p_s(x) \geq 0$, we also have $$C_s(x_1) \geq C_s(x_0) \text{ for any } x_1 \geq x_0, \qquad (54)$$

and $$C_s(0) = 1/2, \ C_s(-\infty) = 0, \text{ and } C_s(\infty) = 1 \qquad (55)$$

Figure 5:
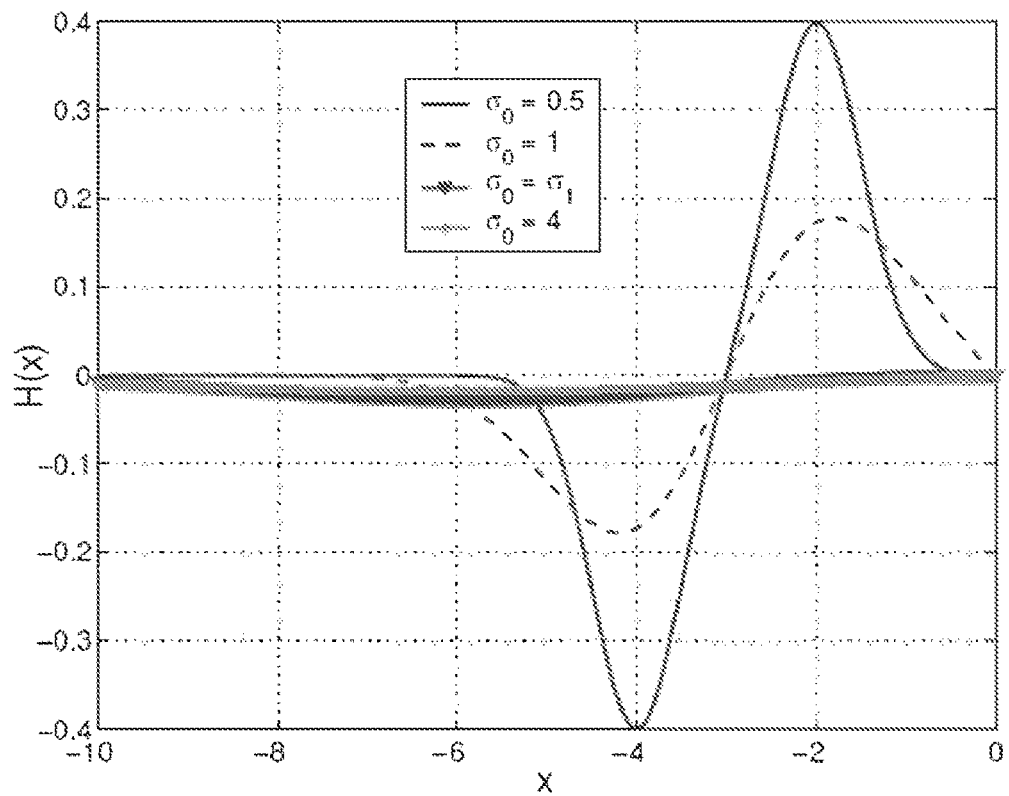
FIG. 5 is a graph illustrating different H(x) curves where $\mu=3$, $A=1$ according to the present invention.

From equations (9) and (53), we have the $P_D$ of $y_s$, given by $$P_D^{y_s} = \int_{-\infty}^\infty p_1(x)C_s(x)dx \qquad (56)$$
$$= \int_{-\infty}^0 p_1(x)C_s(x)dx + \int_0^\infty (1 - C_s(-x))p_1(x)dx$$
$$= \int_{-\infty}^0 (p_1(x) - p_1(-x))C_s(x)dx + P_D^x$$
$$= \int_{-\infty}^0 H(x)C_s(x)dx + P_D^x,$$

where $H(x) \equiv p_1(x) - p_1(-x)$. FIG. 5 shows a plot of H(x) for several $\sigma_0$ values. Finally, from equation (42), we have $$p_1(-x) = \frac{1}{2}\gamma(x; \mu - A, \sigma_0^2) + \frac{1}{2}\gamma(x; -\mu - A, \sigma_0^2).$$

When $A \geq \mu$, since $p_1(-x) \geq p_1(x)$ when $x < 0$, we have, $H(x) < 0$, $x < 0$. From equation (56), $P_D^y \geq P_D^x$ for any H(x), i.e., in this case, the detection performance of this detector cannot be improved by adding symmetric noise. When $A < \mu$ and $\sigma_0 \geq \sigma_1$, then $H(x) < 0$, $\forall x < 0$. Therefore, adding symmetric noise will not improve the detection performance as well. However, when $\sigma_0 \leq \sigma_1$, H(x) has only a single root $x_0$ for $x < 0$ and $H(x) < 0$, $\forall x < x_0$, $H(x) > 0$, $\forall x \in (x_0, 0)$ and detection performance can be improved by adding symmetric SR noise. From equation (56), we have $$C_s^{opt}(x) = \begin{cases} 0, & x < x_0 \\ \frac{1}{2}, & x_0 \leq x \leq 0, \end{cases} \qquad (57)$$

and $$p_s^{opt} = \frac{1}{2}\delta(x - x_0) + \frac{1}{2}\delta(x + x_0).$$

Furthermore, since $\gamma(-\mu; -\mu-A, \sigma_0^2)=\gamma(-\mu; -\mu+A, \sigma_0^2)$ and $\gamma(-\mu; -\mu+A, \sigma_0^2)\approx 0$ given $2\mu-A\gg\sigma_0$, we have $x_0\approx-\mu$. Therefore, $$p_s^{opt} = \frac{1}{2}\delta(x-\mu) + \frac{1}{2}\delta(x+\mu). \tag{58}$$

The pdf of y for the $H_1$ hypothesis becomes $$p_{1,y_s}^{opt}(y) = \frac{1}{2}\gamma(y; A, \sigma_0^2) + \frac{1}{4}\gamma(y; 2\mu+A, \sigma_0^2) + \frac{1}{4}\gamma(y; -2\mu+A, \sigma_0^2). \tag{59}$$

Hence, when $\mu$ is large enough, $$P_{D,opt}^{y_s} = \frac{1}{2}Q\left(-\frac{A}{\sigma_0}\right) + \frac{1}{4} = 0.6707.$$

Note that, as $\sigma_0$ decreases $P_{D,opt}^{y_s}$ increases, i.e., better detection performance can be achieved by adding the optimal symmetric noise.

Similarly, for the uniform noise case, $$C_u(x) = \int_{-x}^{\infty} p_u(t)dt = \begin{cases} 0, & x < \frac{-a}{2} \\ \frac{x}{a}+\frac{1}{2}, & -\frac{a}{2} \le x \le 0 \end{cases} \tag{60}$$

Substituting equation (60) for $C_s(x)$ in (56) and taking the derivative w.r.t $\alpha$, we have $$\frac{dP_D^{y_s}}{d\alpha} = -\frac{1}{\alpha^2}\int_{-\frac{\alpha}{2}}^{0} xH(x)dx. \tag{61}$$

Setting it equal to zero and solving, we have $a_{opt}=8.4143$ in the pdf of uniform noise defined earlier. Additionally, we have $P_{D,opt}^{y_s}=0.6011$.

For the Gaussian case, the optimal WGN level is readily determined since $$P_D^{y_s} = \frac{1}{2}Q\left(\frac{-A-\mu}{\sqrt{\sigma_0^2+\sigma^2}}\right) + \frac{1}{2}Q\left(\frac{-A+\mu}{\sqrt{\sigma_0^2+\sigma^2}}\right). \tag{62}$$

Let $\sigma_2^2=\sigma_0^2+\sigma^2$ and take the derivative w.r.t $\sigma_2^2$ in equation (62), setting it equal to zero and solving, forming $$\sigma_2^2 = 2\frac{\mu A}{\ln\left(\frac{\mu+A}{\mu-A}\right)} = 8.6562, \tag{63}$$

and $\sigma_{opt}^2=\sigma_2^2-\sigma_0^2=7.6562$, and correspondingly, $P_{D,opt}^{y_s}=0.5807$. Therefore, when $\sigma_0^2<\sigma_2^2$, adding WGN with variance $\sigma_{opt}^2$ can improve the detection performance to a constant level $P_{D,opt}^{y_g}$.

Table 1 below is a comparison of detection performance for different SR noise enhanced detectors, and shows the values of $P_{D,opt}^{y}$ for the different types of SR noise. Compared to the original data process with $P_D^x=0.5114$, the improvement of different detectors are 0.1811, 0.1593, 0.0897 and 0.0693 for optimum SR noise, optimum symmetric noise, optimum uniform noise and optimum Gaussian noise enhanced detectors, respectively.

| SR Noise | $P_n^{opt}$ | $P_s^{opt}$ | $P_u^{opt}$ | $P_g^{opt}$ | No SR Noise |
|---|---|---|---|---|---|
| $P_D^y$ | .6915 | .6707 | .6011 | .5807 | .5115 |

Figure 6:
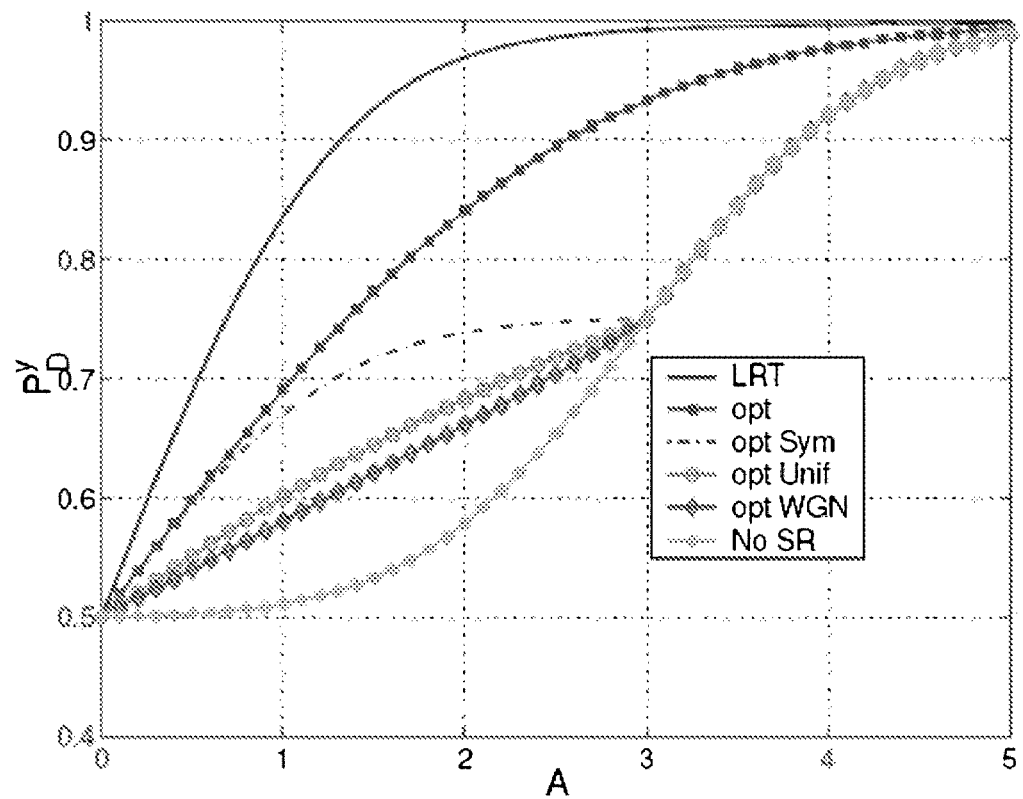
FIG. 6 is a graph of $P_D^y$ as a function of signal level A in Gaussian mixture noise when $\mu=3$ and $\sigma_0=1$ according to the present invention.

FIG. 6 shows $P_D^x$ as well as the maximum achievable $P_D^y$ with different values of A. The detection performance is significantly improved by adding optimal SR noise. When $A \le \mu$, a certain degree of improvement is also observed by adding suboptimal SR noise. When A is small, $x_0\approx-\mu$ and $x_1\approx\mu$, the detection performance of the optimum SR noise enhanced detector is close to the optimum symmetric noise enhanced one. However, when $A>0.6$, the difference is significant. When $A>\mu=3$, $H(x)<0$; $\forall x<0$, so that $P_{D,opt}^{y_s}=P_{D,opt}^{y_u}=P_{D,opt}^{y_g}=P_D^x$, i.e, the optimal symmetric noise is zero (no SR noise). However, by adding optimal SR noise, $P_{D,opt}^y$ is still larger than $P_D^x$, i.e., the detection performance can still be improved. When $A \ge 5$, the $P_D$ improvement is not that significant because $P_D^x>0.97\approx 1$ which is already a very good detector.

Figure 7:
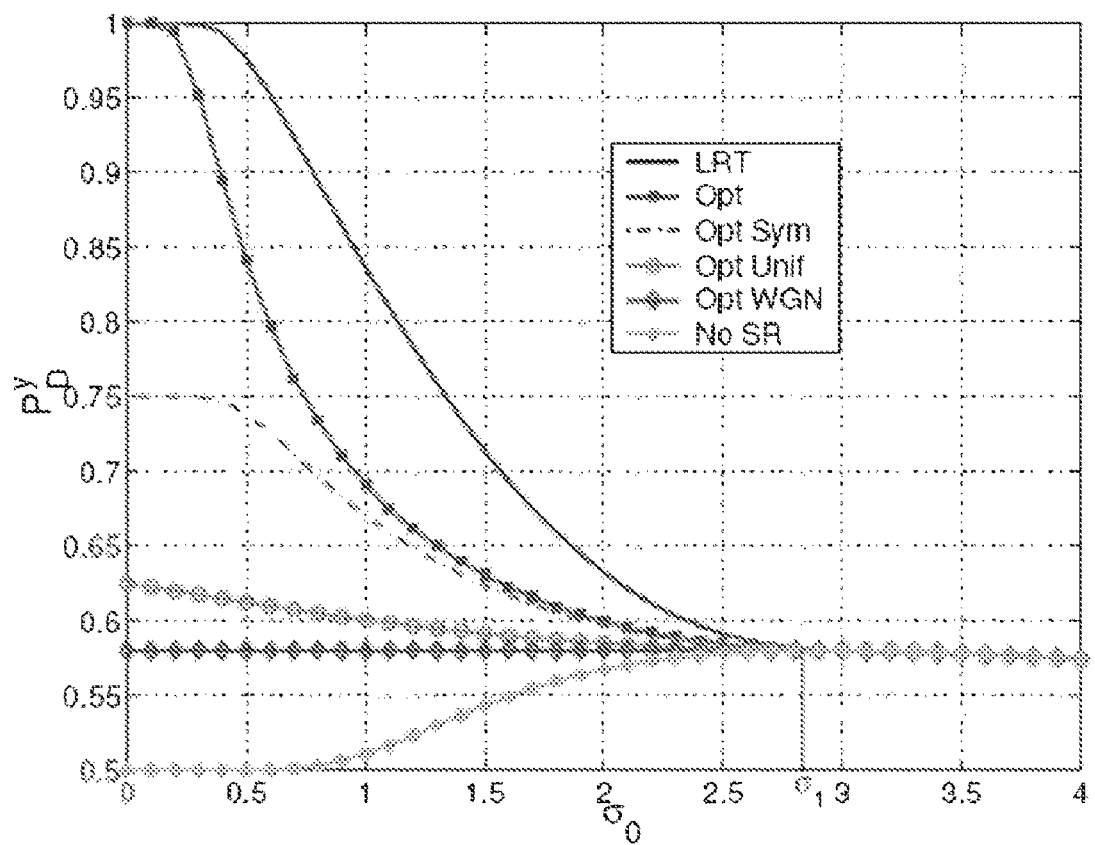
FIG. 7 is a graph of $P_D^y$ as a function of $\sigma_0$ for different types of noise enhanced detectors when $\mu=3$ and $A=1$ according to the present invention.

The maximum achievable detection performance of different SR noise enhanced detectors with different background noise $\sigma_0$ is shown in FIG. 7. When $\sigma_0$ is small, for the optimum SR noise enhanced detectors $P_{D,opt}^y\approx 1$, while for the symmetric SR noise case $P_{D,opt}^{y_s}\approx 0.75$. When $\sigma_0$ increases, $P_D^x$ increases and the detection performance of SR noise enhanced detectors degrades. When $\sigma_0 \ge \sigma_1$, $p_0(x)$ becomes a unimodal noise and the decision function $\phi$ is the same as the decision function decided by the optimum LRT test given the false alarm $P_{FA}=0.5$. Therefore, adding any SR noise will not improve $P_D$. Hence, all the detection results converge to $P_D^x$.

Figure 8:
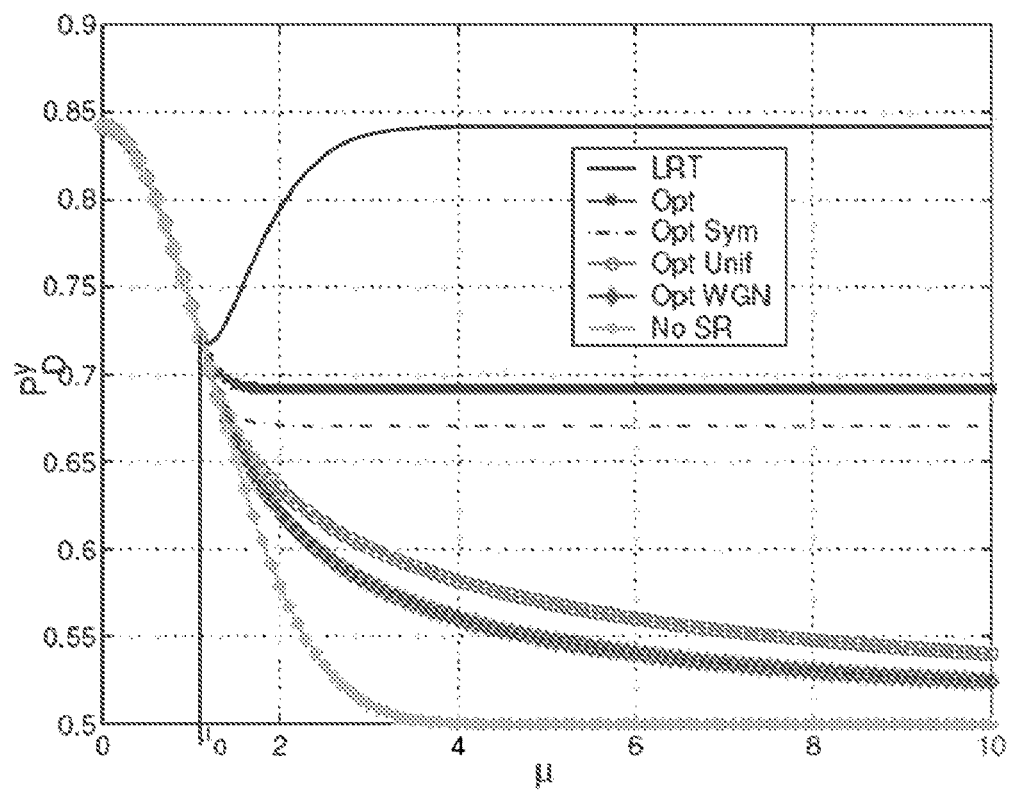
FIG. 8 is a graph of $P_D^y$ as a function of $\mu$ for different types of noise enhanced detectors when $\sigma_0=1$ and $A=1$ according to the present invention.

FIG. 8 compares the detection performance of different detectors w.r.t. $\mu$ when $A=1$ and $\sigma_0=1$ is fixed. $P_D^x$, $P_{D,opt}^{y_s}$ and $P_{D,opt}^{y_g}$ monotonically decrease when $\mu$ increases. Also, there exists a unique $\mu$ value $\mu_0$, such that when $\mu<\mu_0$ is small, $p_0$ is still a unimodal pdf, so that the decision function $\phi$ is the optimum one for $P_{FA}=0.5$. An interesting observation from FIG. 8 is that the $P_D$ of the "optimum LRT" after the lowest value is reached, increases when $\mu$ increases. The explanation of this phenomenon is that when $\mu$ is sufficiently large, the separation of the two peaks of the Gaussian mixtures increases as $\mu$ increases so that the detectability is increased. When $\mu \to \infty$, the two peaks are sufficiently separated, so that the detection performance of "LRT" is equal to the $P_D$ when $\mu=0$.

Figure 9:
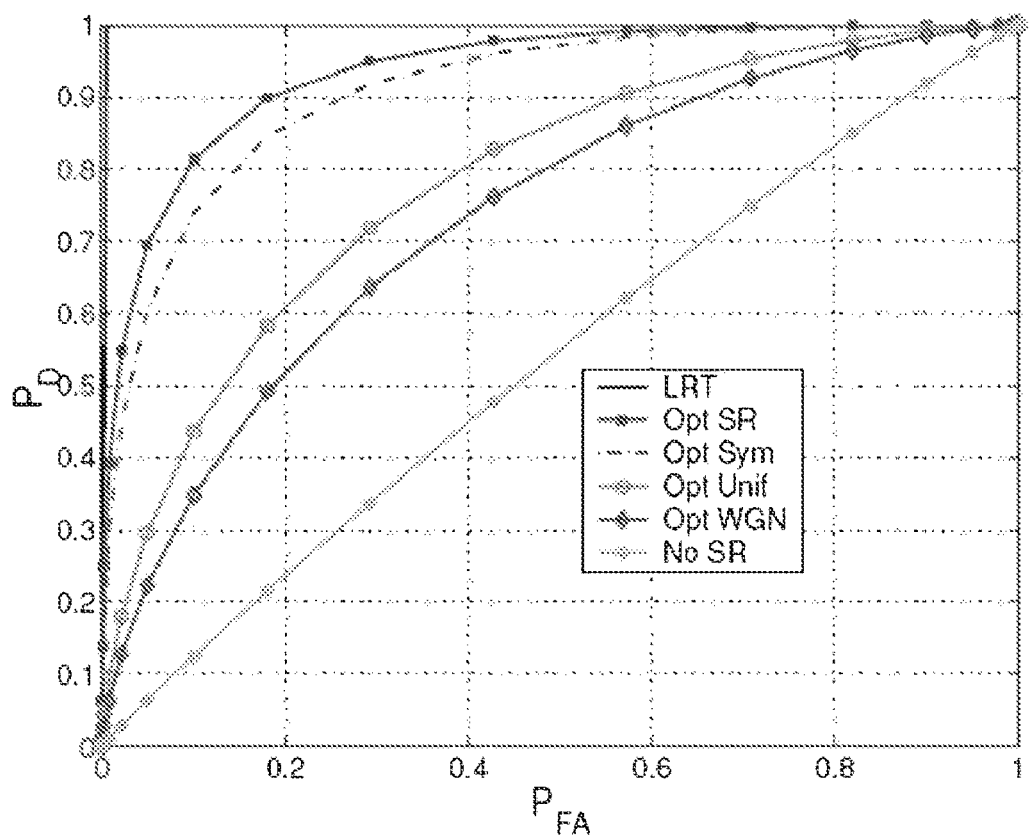
FIG. 9 is a graph of the ROC curves for different SR noise enhanced sign detectors when N=30 according to the present invention.

Finally, FIG. 9 shows the ROC curves for the detection problem when $N=30$ and the different types of i.i.d SR noise determined previously are added. Different degrees of improvement are observed for different SR noise pdfs. The optimum SR detector and the optimum symmetric SR detector performance levels are superior to those of the uniform and Gaussian SR detectors and more closely approximate the LRT curve. For LRT, the performance is nearly perfect ($P_D\approx 1$ for all $P_{FA}s$).

The present invention thus establishes a mathematical theory for the stochastic resonance (SR) noise modified detection problem, as well as several fundamental theorems on SR in detection theory. The detection performance of a SR noise enhanced detector is analyzed where, for any additive noise, the detection performance in terms of $P_D$ and $P_{FA}$ can be obtained by applying the expressions of the present invention. Based on these, the present invention established the conditions of potential improvement of $P_D$ via the SR effect, which leads to the sufficient condition for the improvability/non-improvability of most suboptimal detectors.

The present invention also established the exact form of the optimal SR noise pdf. The optimal SR noise is shown to be a proper randomization of no more than two discrete signals. Also, the upper limit of the SR enhanced detection performance is obtained by the present invention. Given the distributions $p_1$ and $p_0$, the present invention provides an approach to determine the optimal SR consisting of the two discrete signals and their corresponding weights. It should be pointed out that the present invention is applicable to a variety of SR detectors, e.g., bistable systems.

Figure 10:
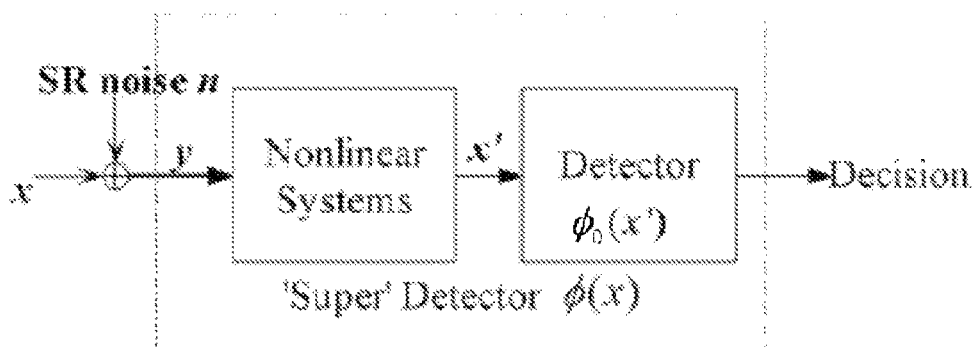
FIG. 10 is a schematic of an SR detection system according to the present invention.

The SR detectors that may be implemented with the present invention are shown in FIG. 10. For example, the nonlinear system block of FIG. 10 can depict the bistable system. Let $x=[x_1, x_2, \ldots, x_n]^T$ be the input to the nonlinear system, and $x'=[x_{01}, x_{02}, \ldots, x_N]^T$ be the output of the system as shown, where $x'=f(x)$ is the appropriate nonlinear function. The decision problem based on $x'$ can be described by decision function $\phi_0(\cdot)$ as shown. It is easy to observe that the corresponding decision function $\phi(\cdot)$ for the 'super' detector (i.e., the nonlinear system plus detector) is $\phi(x)=\phi_0(f(x))$. Thus, the SR detectors can be viewed as the system in FIG. 10 without the additive SR noise n. To summarize, the present invention admits conventional SR systems and allows improved detection system by adding n as shown in FIG. 10.

Figure 11:
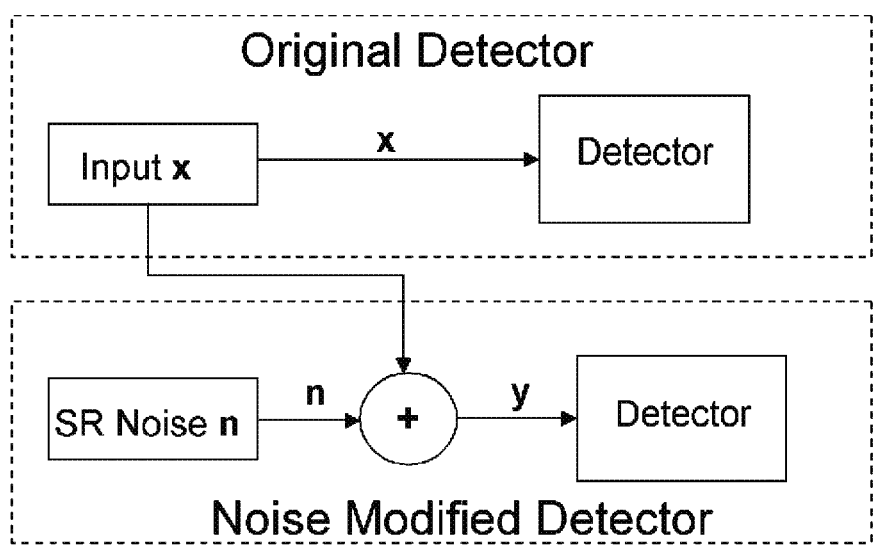
FIG. 11 is a schematic of an SR detection system according to the present invention

FIG. 11 illustrates a diagram of a SR detection system obtained by a modification of the observed data, x. The statistical properties of the data are changed by adding independent SR noise n to yield a new process y such that y=x+n. This process, in turn is provided as input to the noise modified detector.

Based on the mathematical framework of the present invention, for a particular detection problem, the detection performance of six different detectors are compared, namely, the optimum LRT detector, optimum noise enhanced sign detector, optimum symmetric noise enhanced sign detector, optimum uniform noise enhanced sign detector, optimum Gaussian noise enhanced sign detector and the original sign detector. Compared to the traditional SR approach where the noise type is predetermined, much better detection performance is obtained by adding the proposed optimum SR noise to the observed data process. The present invention thus corresponds with the observed SR phenomenon in signal detection problems, and greatly advances the determination the applicability of SR in signal detection. The present invention can also be applied to many other signal processing problems such as distributed detection and fusion as well as pattern recognition applications.

The present invention may thus be used to increase the probability of detecting signals embedded in non-Gaussian noise. The first step is to record data from an observed data process. Next, stochastic resonance noise is added to said recorded. The appropriate stochastic resonance noise is controlled by determining the stochastic resonance noise probability density function (PDF) that does not increase the detector probability of false alarm.

The SR noise may be determined for the case of a known data probability density function by determining from the known probability density function of the observed data process the stochastic resonance noise PDF that equals $\lambda\delta(n-n_1)+(1-\lambda)\delta(n-n_2)$, with values $n_1$ and $n_2$ equal to those of the two delta function locations, and with probabilities equal to $\lambda$ and $(1-\lambda)$, respectively. More specifically, the stochastic resonance noise PDF may be calculated by determining $F_i(x)=\int_{R^N}\phi(y)p_i(y-x)dy$ $i=0,1$, using known critical function $\phi(y)$ and known data probability density functions $p_i(\cdot)$, $i=0,1$; determining the three unknown quantities $n_1$, $n_2$, and $\lambda$ using the known values $k_0$, $f_{01}$ and $f_{02}$ and the following three equations:

$$\frac{dJ}{df_0}(f_{01}(k_0)) = \frac{dJ}{df_0}(f_{02}(k_0)); \qquad (i)$$

$$\frac{dJ}{df_0}(f_{02}(k_0)) = k_0; \qquad (ii)$$

$$J(f_{02}(k_0)) - J(f_{01}(k_0)) = k_0(f_{02}(k_0) - f_{01}(k_0)); \qquad (iii)$$

and determining the probability of occurrence for $n_1$ and $n_2$ as $\lambda$ and $1-\lambda$, respectively, using the equation $$\lambda = \frac{f_{02}(k_0) - P_{FA}^x}{f_{02}(k_0) - f_{01}(k_0)}.$$

Alternatively, the SR noise for the case of a known data probability density function may be calculated by determining the stochastic resonance noise PDF that consists of a single delta function, $\delta(n-n_0)$ with value no equal to the delta function location with probability one. The minimum probability of error may be calculated from $$P_{e,\min} = \pi_1\left[1 - \max_{f_0} G\left(f_0, \frac{\pi_0}{\pi_1}\right)\right]$$

where $G(f_0, k)=J(f_0)-kf_0=P_D-kP_{FA}$. The single delta function located at $n_0$ is calculated from $n_0=F_0^{-1}(f_0)$, where $f_0$ is the value the maximizes $$G\left(f_0, \frac{\pi_0}{\pi_1}\right).$$

The SR noise for the case of labeled data with an unknown data PDF may be determined by first calculating the stochastic resonance noise PDF that consists of two delta functions. This step is accomplished by estimating the stochastic resonance noise consisting of two random variables $n_1$ and $n_2$ by using many algorithms, such as expectation-maximization (EM) and the Karzen method to estimate the unknown data PDFs, and applying the estimated PDFs and the stochastic resonance noise PDF may be calculated by determining $F_i(x)=\int_{R^N}\phi(y)p_i(y-x)dy$ $i=0,1$, using known critical function $\phi(y)$ and known data probability density functions $p_i(\cdot)$, $i=0,1$; determining the three unknown quantities $n_1$, $n_2$, and $\lambda$ using the known value $k_0$, and estimated values $\hat{f}_{01}$, $\hat{f}_{02}$, and $\hat{J}$ in the following three equations:

$$\frac{d\hat{J}}{df_0}(\hat{f}_0(k_0)) = \frac{d\hat{J}}{df_0}(\hat{f}_{02}(k_0); \qquad (i)$$

-continued $$\frac{d\hat{J}}{df_0}(\hat{f}_{02}(k_0)) = k_0; \quad \text{(ii)}$$

$$\hat{J}(\hat{f}_{02}(k_0)) - \hat{J}(\hat{f}_{01}(k_0)) = k_0(\hat{f}_{02}(k_0) - \hat{f}_{01}(k_0)); \quad \text{(iii)}$$

and determining the probability of occurrence for $n_1$ and $n_2$ as $\lambda$ and $1-\lambda$, respectively, using the equation $$\lambda = \frac{\hat{f}_{02}(k_0) - P_{FA}^x}{\hat{f}_{02}(k_0) - \hat{f}_{01}(k_0)}.$$

The next step is to determine the stochastic resonance noise consisting of two random variables $n_1$ and $n_2$ with values equal to those of the two delta function locations and with probabilities equal to those of said stochastic resonance noise probability density function; adding said stochastic resonance noise to said data; applying said fixed detector to the resulting data process.

Finally, a test statistic for signal detection is calculated under a constant probability of false alarm rate (CFAR) constraint, such that the performance of suboptimal, nonlinear, fixed detectors operating in said non-Gaussian noise are improved. Increasing the probability of detecting signals embedded in non-Gaussian noise comprises adding the stochastic resonance noise $n_1$ and $n_2$ with probability $\lambda$ and $1-\lambda$, respectively, to the data, and applying the fixed detector to the resulting data process.

The present invention also provides a method for evaluating functions using $f_1$, $J(f_0)$, and $dJ/df_0$ where for any $f_0$, the equation $x = F_0^{-1}(f_0)$ is solved, and the value of $f_1$ is obtained by $$f_1 = F_1(x), J(f_0)$$
$$= \max_{f_1}(f_1(f_0)),$$
$$\text{and } \frac{dJ}{df_0} = \lim_{\Delta \to 0} \frac{J(f_0 + \Delta) - J(f_0)}{\Delta}.$$

Following is background information relative to the formulas of the present invention and the applicable theorems on convex functions and convex sets.

A. Convex Functions

A function $f: I \to R$ is called convex if $$f(\lambda x + (1-\lambda)y) \leq \lambda f(x) + (1-\lambda)f(y) \quad (64)$$

for all $x, y \in I$ and $\lambda$ in the open interval $(0,1)$. It is called strictly convex provided that the inequality (64) is strict for $x \neq y$. Similarly, if $-f: I \to R$ is convex, then we say that $f: I \to R$ is concave.

Theorem A-1: Suppose $f''$ exists on $(a,b)$. Then $f$ is convex if and only if $f''(x) \geq 0$. And if $f''(x) > 0$ on $(a,b)$, then $f$ is strictly convex on the interval.

B. Convex Sets

Let U be a subset of a linear space L. We say that U is convex if $x, y \in U$ implies that $z = [\lambda x + (1-\lambda)y] \in U$ for all $\lambda \in [0, 1]$.

Theorem A-2: A set $U \subseteq L$ is convex if and only if every convex combination of points of U lies in U.

We call the intersection of all convex sets containing a given set U the convex hull of U denoted by H(U).

Theorem A-3: For any $U \subseteq L$, the convex hull of U consists precisely of all convex combinations of elements of U.

Furthermore, for the convex hull, we have Carathéodory's theorem for convex sets.

Theorem A-4 (Carathéodory's Theorem): If $U \subseteq L$, and its convex hull of H(U) has dimension m, then for each $z \in H(U)$, there exists m+1 points $x_0, x_1, \ldots x_m$ of U such that z is a convex combination of these points.

What is claimed is:

1. A method of improving the detection of at least one signal embedded in non-Gaussian noise, said method comprising the steps of:
   (a) recording an observed data process;
   (b) calculating with a processor stochastic resonance noise by determining the stochastic resonance noise probability density function that does not increase the probability of false alarm and calculating the stochastic resonance noise data probability density function from a known probability density function for said observed data process, wherein the stochastic resonance noise probability density function equals $\lambda\delta(n-n_1)+(1-\lambda)\delta(n-n_2)$, with values $n_1$ and $n_2$ equal to two delta function locations having probabilities of $\lambda$ and $(1-\lambda)$, respectively;
   (c) adding said stochastic resonance noise to said data; and
   (d) displaying the results of adding said stochastic noise to said data, thereby improving the detection of said at least one signal in said non-Gaussian noise.

2. The method of claim 1, wherein the step of calculating the stochastic resonance noise probability density function further comprises the steps of
   (i) determining $F_i(x) = \int_{R^N} \phi(y) p_i(y-x) dy$ i=0,1 using known critical function $\phi(y)$ and known data probability density functions $p_i(\bullet)$, i=0,1;
   (ii) determining the three unknown quantities $n_1$, $n_2$, and $\lambda$ using the known values $k_0$, $f_{01}$ and $f_{02}$ using equations, $$\frac{dJ}{df_0}(f_{01}(k_0)) = \frac{dJ}{df_0}(f_{02}(k_0)),$$

$$\frac{dJ}{df_0}(f_{02}(k_0)) = k_0,$$

and $J(\theta_{02}(k_0)) - J(f_{01}(k_0)) = k_0(f_{02}(k_0) - f_{01}(k_0))$; and
   (iii) determining the probability of occurrence for $n_1$ and $n_2$ as $\lambda$ and $1-\lambda$, respectively, using the equation $$\lambda = \frac{f_{02}(k_0) - P_{FA}^x}{f_{02}(k_0) - f_{01}(k_0)}.$$

3. The method of claim 2, wherein the step of adding said stochastic resonance noise to said data comprises the steps of:
   adding said stochastic resonance noise $n_1$ and $n_2$ with probability $\lambda$ and $1-\lambda$, respectively, to said data to form a data process; and
   applying a fixed detector to said data process.

4. The method of claim 1, further comprising the steps of:
   determining from said observed data process the stochastic resonance noise probability density function that consists of two delta functions;
   determining stochastic resonance noise consisting of two random variables $n_1$ and $n_2$ with values equal to those of said two delta function locations and having probabilities equal to those of said stochastic resonance noise probability density function adding said stochastic resonance noise to said data; and applying a fixed detector to the resulting data process.

5. The method of claim 4, wherein the step of determining from said observed data process the stochastic resonance noise probability density function that consists of two delta functions comprises the steps of:

estimating the stochastic resonance noise consisting of two random variables $n_1$ and $n_2$ by estimating the unknown data probability density functions;

applying estimated probability density functions;

determining $F_i(x) = \int_{R^N} \phi(y) p_i(y-x) dy$ i=0,1, using known critical function $\phi(y)$ and known data probability density functions $p_i(\bullet)$, i=0,1;

determining the three unknown quantities $n_1$, $n_2$, and $\lambda$ using the known value $k_0$, and estimated values for $\hat{f}_{01}$, $\hat{f}_{02}$, and $\hat{J}$ in the equations $$\frac{d\hat{J}}{df_0}(\hat{f}_{01}(k_0)) = \frac{d\hat{J}}{df_0}(\hat{f}_{02}(k_0)),$$

$$\frac{d\hat{J}}{df_0}(\hat{f}_{02}(k_0)) = k_0,$$

and $\hat{J}(\hat{f}_{02}(k_0)) - \hat{J}(\hat{f}_{01}(k_0)) = k_0(\hat{f}_{02}(k_0) - \hat{f}_{01}(k_0))$; and determining the probability of occurrence for $n_1$ and $n_2$ as $\lambda$ and $1-\lambda$, respectively, using the equation $$\lambda = \frac{\hat{f}_{02}(k_0) - P_{FA}^x}{\hat{f}_{02}(k_0) - \hat{f}_{01}(k_0)}.$$

6. A method in reducing the probability of error in non-Gaussian noise, comprising the steps of:

recording an observed data process;

determining with a processor stochastic resonance noise by identifying a known data probability density function for said data process and determining from said known probability density function of said observed data process, wherein the stochastic resonance noise probability density function that consists of a single delta function, $\delta(n-n_0)$ with value $n_0$ equal to a delta function location with probability one;

adding said stochastic resonance noise to the data of the recorded data process; and displaying the results of adding said stochastic noise to said data.

7. The method of claim 6, further comprising the step of determining a minimum probability of error using $$P_{e,min} = \pi_1\left[1 - \max_{f_0} G\left(f_0, \frac{\pi_0}{\pi_1}\right)\right],$$

where $G(f_0, k) = J(f_0) - kf_0$ $$= P_D - kP_{FA}.$$

8. The method of claim 7, wherein the stochastic resonance noise probability density function consists of a single delta function located at $n_0$ and is calculated according to $n_0 = F_0^{-1}(f_0)$, where $f_0$ is the value the maximizes $$G\left(f_0, \frac{\pi_0}{\pi_1}\right).$$

* * * * *

UNITED STATES PATENT AND TRADEMARK OFFICE
CERTIFICATE OF CORRECTION

PATENT NO. : 7,668,699 B2 Page 1 of 1
APPLICATION NO. : 11/551473
DATED : February 23, 2010
INVENTOR(S) : Hao Chen, James Michels and Pramod K. Varshney It is certified that error appears in the above-identified patent and that said Letters Patent is hereby corrected as shown below:

Column 20, Claim 2, line 46 the equation beginning with "J(θ)" should be --J($f$--

Signed and Sealed this

Sixth Day of April, 2010

David J. Kappos
*Director of the United States Patent and Trademark Office*